United States Patent
Schlemmer et al.

(10) Patent No.: US 10,544,696 B2
(45) Date of Patent: Jan. 28, 2020

(54) STABILIZED SEALING RING FOR A TURBOMACHINE

(71) Applicant: MTU Aero Engines AG, Munich (DE)

(72) Inventors: Markus Schlemmer, Mainburg/Sandelzhausen (DE); Otto Liebscher, Zorneding (DE); Oliver Thiele, Dachau (DE)

(73) Assignee: MTU Aero Engines AG, Munich (DE)

(*) Notice: Subject to any disclaimer, the term of this patent is extended or adjusted under 35 U.S.C. 154(b) by 227 days.

(21) Appl. No.: 15/367,697

(22) Filed: Dec. 2, 2016

(65) Prior Publication Data

US 2017/0159472 A1     Jun. 8, 2017

(30) Foreign Application Priority Data

Dec. 4, 2015  (DE) .......... 10 2015 224 379

(51) Int. Cl.
| | |
|---|---|
| *F01D 11/00* | (2006.01) |
| *F01D 9/04* | (2006.01) |
| *F04D 29/08* | (2006.01) |
| *F04D 29/54* | (2006.01) |
| *F16J 15/447* | (2006.01) |

(52) U.S. Cl.
CPC .......... *F01D 11/003* (2013.01); *F01D 9/041* (2013.01); *F04D 29/083* (2013.01); *F04D 29/542* (2013.01); *F16J 15/447* (2013.01); *F05D 2220/32* (2013.01); *F05D 2240/60* (2013.01)

(58) Field of Classification Search
CPC ............ F04D 29/083; F04D 11/001; F04D 11/005–008; F01D 11/00–06
See application file for complete search history.

(56) References Cited

U.S. PATENT DOCUMENTS

| | | | | |
|---|---|---|---|---|
| 4,211,424 A | * | 7/1980 | Stein | F01D 11/003 277/352 |
| 5,215,435 A | | 6/1993 | Webb et al. | |
| 5,639,212 A | | 6/1997 | Schaefer et al. | |
| 7,967,559 B2 | * | 6/2011 | Bunker | F01D 5/081 415/170.1 |
| 2002/0004006 A1 | * | 1/2002 | Briesenick | F01D 11/00 415/173.7 |
| 2014/0050564 A1 | * | 2/2014 | Hagan | F01D 11/001 415/116 |

(Continued)

FOREIGN PATENT DOCUMENTS

| | | |
|---|---|---|
| DE | 19628559 A1 | 1/1998 |
| DE | 10122732 A1 | 11/2002 |

(Continued)

*Primary Examiner* — Kenneth Bomberg
*Assistant Examiner* — Hakeem M Abdellaoui
(74) *Attorney, Agent, or Firm* — Barlow, Josephs & Holmes, Ltd.

(57) ABSTRACT

Disclosed is a sealing ring for a turbomachine, which is constructed so as to be fastened at a radially inner region of a plurality of guide vanes and rotate around a rotor shaft. The sealing ring comprises a ring part that extends in the axial direction and has a plurality of stiffened portions in succession in the peripheral direction. Further disclosed is a seal for a turbomachine that comprises such a sealing ring as well as a brush and/or run-in coating sealing ring that is to face a rotor shaft, and a method for the manufacture of a sealing ring.

9 Claims, 2 Drawing Sheets

(56) References Cited

U.S. PATENT DOCUMENTS

| | | | |
|---|---|---|---|
| 2014/0294570 A1* | 10/2014 | Hiller | F01D 11/08 |
| | | | 415/173.1 |
| 2015/0040567 A1* | 2/2015 | Lu | F01D 11/02 |
| | | | 60/722 |
| 2015/0275684 A1* | 10/2015 | Thatte | F01D 1/04 |
| | | | 415/230 |
| 2015/0369367 A1* | 12/2015 | Kuroki | F16J 15/442 |
| | | | 277/543 |
| 2016/0362992 A1* | 12/2016 | Roy Thill | F01D 5/14 |
| 2018/0106157 A1* | 4/2018 | Kovacik | F01D 11/003 |

FOREIGN PATENT DOCUMENTS

| | | |
|---|---|---|
| DE | 102007019952 A1 | 10/2008 |
| DE | 102008002862 A1 | 12/2008 |
| DE | 102014109338 A1 | 1/2015 |
| EP | 2846067 A1 | 3/2015 |
| WO | 2014122371 A1 | 8/2014 |

\* cited by examiner

STABILIZED SEALING RING FOR A TURBOMACHINE

BACKGROUND OF THE INVENTION

The present invention relates to a sealing ring for a turbomachine, a seal for a turbomachine, a turbomachine, and a method for the manufacture of a sealing ring for a turbomachine.

Turbomachines (such as, for example, aircraft engines and stationary gas turbines) have a rotor with a plurality of rotating blades as well as a guide vane cascade or a guide vane row with a plurality of guide vanes. The guide vanes serve to optimize the flow conditions for the rotating blades; guide vanes and rotating blades are arranged in succession in the primary flow direction.

In order to seal a region between guide vanes and rotor radially inward from the flow duct, seals are commonly fastened at the radially (referred to the axis of rotation) inner-lying ends of the guide vanes or guide vane segments; the English terms "inner air seal (IAS)" or "static inner air seal (SIAS)" are also used for these seals in technical jargon. Such a seal can comprise, for example, a brush or run-in coating sealing ring (for example, a honeycomb seal), which can be arranged facing the rotor shaft at the guide vanes or guide vane segments. Preferably, the fastening is made in such a way that the seal is mounted so as to move in the radial direction relative to the guide vanes or guide vane segments and, in particular, is mounted to them in a spoke-centered manner; in this way, it is possible to take into account in the design the different thermal expansions between a guide vane ring formed from the guide vanes or guide vane segments and the brush or run-in coating sealing ring during operation of the turbomachine. Such seals are disclosed, for example, in the publications DE 196 28 559 A1 and DE 101 22 732 A1.

In addition to the brush or run-in coating sealing ring, the seals can have at least one sealing ring further outward radially, which, in each case, faces an axially adjacent rotating blade ring and reduces any radial flow between guide vanes and rotating blades.

BRIEF SUMMARY OF THE INVENTION

The present invention addresses the object of providing a technology with which seals in turbomachines can be improved.

The object is achieved by a sealing ring, a seal, a turbomachine, and a method for the manufacture of a sealing ring in accordance with the present invention. Advantageous embodiments are disclosed in detail below.

A sealing ring according to the invention for a turbomachine is constructed for the purpose of being fastened to a radially inner region of a plurality of guide vanes in such a way that it rotates around a rotor shaft. The sealing ring comprises a ring part that extends essentially in the axial direction and has a plurality of successive stiffened portions in the peripheral direction. The ring part that extends essentially in the axial direction can comprise at least one cylindrical and/or at least one essentially conical section in this case, wherein the cylinder or cone axis preferably coincides in each case with a central axis of the sealing ring.

The terms "radially," "axially," and "peripheral direction" always refer in this specification—unless stated otherwise—to a central axis of the sealing ring; once the sealing ring has been fastened, this axis coincides preferably with the axis of rotation of a rotor shaft of the turbomachine.

A seal according to the invention for a turbomachine is constructed so as to be fastened at a radially inner region of a plurality of guide vanes and rotate around a rotor shaft. It comprises at least one sealing ring according to the invention in accordance with one of the embodiments disclosed in this specification as well as a brush and/or run-in coating sealing ring that is to face the rotor shaft.

A turbomachine can accordingly have a plurality of guide vanes as well as a rotor shaft with a plurality of rotor blades, wherein the guide vanes are arranged radially around the rotor shaft. In each case, a seal according to the invention in accordance with one of the embodiments disclosed in this specification is preferably fastened in a radially inner region of the guide vanes.

A method according to the invention for the manufacture of a sealing ring comprises a fabrication of an unfinished form for the sealing ring with at least one (preferably radially extending) fastening means (for example, a fastening edge or a plurality of fastening projections) as well as a ring part extending in the axial direction. The method further comprises a construction with a plurality of stiffened portions in the ring part extending in the axial direction, wherein the stiffened portions are arranged in succession in the peripheral direction.

The stiffened portions in the ring part extending in the axial direction of a sealing ring according to the invention offer the advantage of an increased stiffness of the sealing ring. Beyond this, it is possible with them to induce an advantageous shift of the natural or characteristic frequencies in a range above interfering exciting frequencies, so that detrimental resonance can be prevented.

A sealing ring according to the invention can be constructed for the purpose of being fastened directly to the plurality of guide vanes or to be fastened to them by means of an additional component, which, in turn, can be fastened to the guide vanes (for example, to their roots). Such a component can be part of a seal, which, in addition, can comprise further elements (for example, a brush or run-in coating sealing ring).

For the fastening, the sealing ring can have fastening means, such as, in particular, a bent fastening edge that runs essentially radially from the ring part extending in the axial direction and can be screwed onto each radial appendage of the guide vanes or clamped to it. However, the fastening of the sealing ring to the guide vanes occurs in this case preferably not directly, but rather indirectly via a radial projection of the brush or run-in coating sealing ring. In this case, the brush or run-in coating sealing ring is preferably fastened in a spoke-centered manner to a guide vane cascade formed from a plurality of guide vanes. Such a fastening edge can be formed from a plurality of surface area segments, each of which can be bent (in the radial direction) from the ring part extending in the axial direction. For the fastening, the fastening edge can have notches or holes (for example, bores) for bolts or screws. A method according to the invention can comprise the creating of such fastening means.

The radially inner-lying region of the guide vanes, which joins most of the guide vanes together to form a row of guide vanes, can be arranged between the rotor shaft and a shroud, for example. In this case, the sealing ring can be constructed so as to be in contact with the shroud or to be fastened to it at a distance. In particular, the radially inner-lying region (to which the sealing ring is constructed to be fastened) can comprise a radially inner root of a guide vane.

According to a preferred embodiment of the present invention, the stiffened portions are distributed uniformly (that is, at regular intervals) over the periphery of the ring part extending in the axial direction (or are formed in this way). As a result, the sealing ring has a uniform stability and a suitable characteristic frequency can be established in a targeted manner.

The number of stiffened portions on the ring part can preferably lie between 15 and 30 and even more advantageously between 18 and 24. As a result, it is possible to attain a suitable stiffness and thus a suitable load capacity of the sealing ring and, at the same time, to avoid a detrimental heavy weight. In particular, the stiffened portions can be arranged in such a way that, after an intended fastening of the sealing ring, a stiffened portion is arranged between every two guide vanes. Accordingly, depending on the size of the turbomachine, substantially more than 30 stiffened portions can be provided on the ring part, namely up to 60 or yet even more.

The stiffened portions can be designed in each instance as radial depressions (or beading) or as radial elevations. In this case, a sealing ring according to the invention can have stiffened portions of various types (that is, depressions and elevations) or only stiffened portions of the same type (only depressions or only elevations). According to an advantageous variant of a method according to the invention, the stiffened portions are correspondingly impressed as depressions or molded as elevations. As a result, a sealing ring according to the invention can be adapted to the geometry of the guide vanes and, in addition, a favorable characteristic frequency can be established in a suitable way.

Preferably, at least a part of the stiffened portions or all of the stiffened portions has or have at least one curved or arched surface (in at least one direction). In particular, the stiffened portions can each be formed essentially along a conical surface and/or along a surface of a rotational paraboloid. In this case, a central axis of such a conical surface or of such a rotational paraboloid can preferably run in a plane with the central axis of the sealing ring or even can run parallel to the central axis of the sealing ring; the stiffened portions are correspondingly formed according to an advantageous embodiment of a method according to the invention. Shapes of this type are especially advantageous in terms of fluid mechanics, because vortexes created by them in the primary flow are minimal in the region. Especially preferred are embodiments in which the stiffened portions are tapered going from a provided fastening means (for fastening of the sealing ring) in the axial direction. In this case, it is advantageous when a free edge of the ring part has a circular shape. This means that the stiffened portion, which can be a radial elevation (bump) or a radial depression (dent), extends in the axial direction only so far that the free edge of the ring part is not affected. In this way, it can be ensured that a sealing gap is essentially identical between the free edge of the ring part and an axial projection of an axially adjacent rotating blade or row of rotating blades or cascade of rotating blades over the entire periphery.

An aspect of the present invention relates to a turbomachine with a rotor shaft, a plurality of guide vanes, which together form a guide vane cascade of a turbine stage or compressor stage, and a sealing ring described above, wherein the seal, together with the at least one sealing ring, is fastened at the radially inner region of the plurality of guide vanes. In this case, the fastening is preferably designed in such a way that thermally induced, different radial expansions between the guide vane cascade and the seal can be compensated by the sealing ring. To this end, a spoke-centered fastening can be provided.

In an advantageous embodiment of the invention, the turbomachine further comprises a rotating blade cascade that is axially adjacent to the guide vane cascade and has a plurality of rotating blades, wherein the guide vanes each comprise a radially inner cover plate and the rotating blades each comprise an axial projection at a radially inner region, this project being directed toward the guide vane cascade, wherein the ring part of the sealing ring extending in the axial direction, together with the radially inner cover plates of the guide vanes and the axial projections of the rotating blades, form a labyrinth seal, which is also referred to as a "fishmouth seal." The labyrinth seal serves to reduce any gas flow in the radial direction in the region between each of the radially inner ends of the guide vanes and rotating blades. In particular, in the case when the guide vanes and rotating blades are the vanes and blades of a turbine stage of the turbomachine, the labyrinth seal prevents or reduces any intake of hot gas from a hot-gas duct radially inward.

Preferably, to this end, the axial projections of the rotating blades are arranged in the radial direction between the radially inner cover plates of the guide vanes and the ring part of the sealing ring.

A reduction of any undesired gas flow in the radial direction can occur in an especially effective manner in the case when the guide vane cascade comprises two sealing rings, wherein one of the two sealing rings forms a labyrinth seal as described above with an upstream rotating blade cascade and the other one of the two sealing rings forms a corresponding labyrinth seal with a downstream rotating blade cascade.

BRIEF DESCRIPTION OF THE DRAWINGS

Preferred exemplary embodiments of the invention will be described below in detail on the basis of drawings. It is obvious that individual elements and components can also be combined differently than illustrated. Reference numbers for elements that correspond to one another are used across the figures and are not described anew for each figure.

Shown schematically are.

DESCRIPTION OF THE INVENTION

Figure 1:
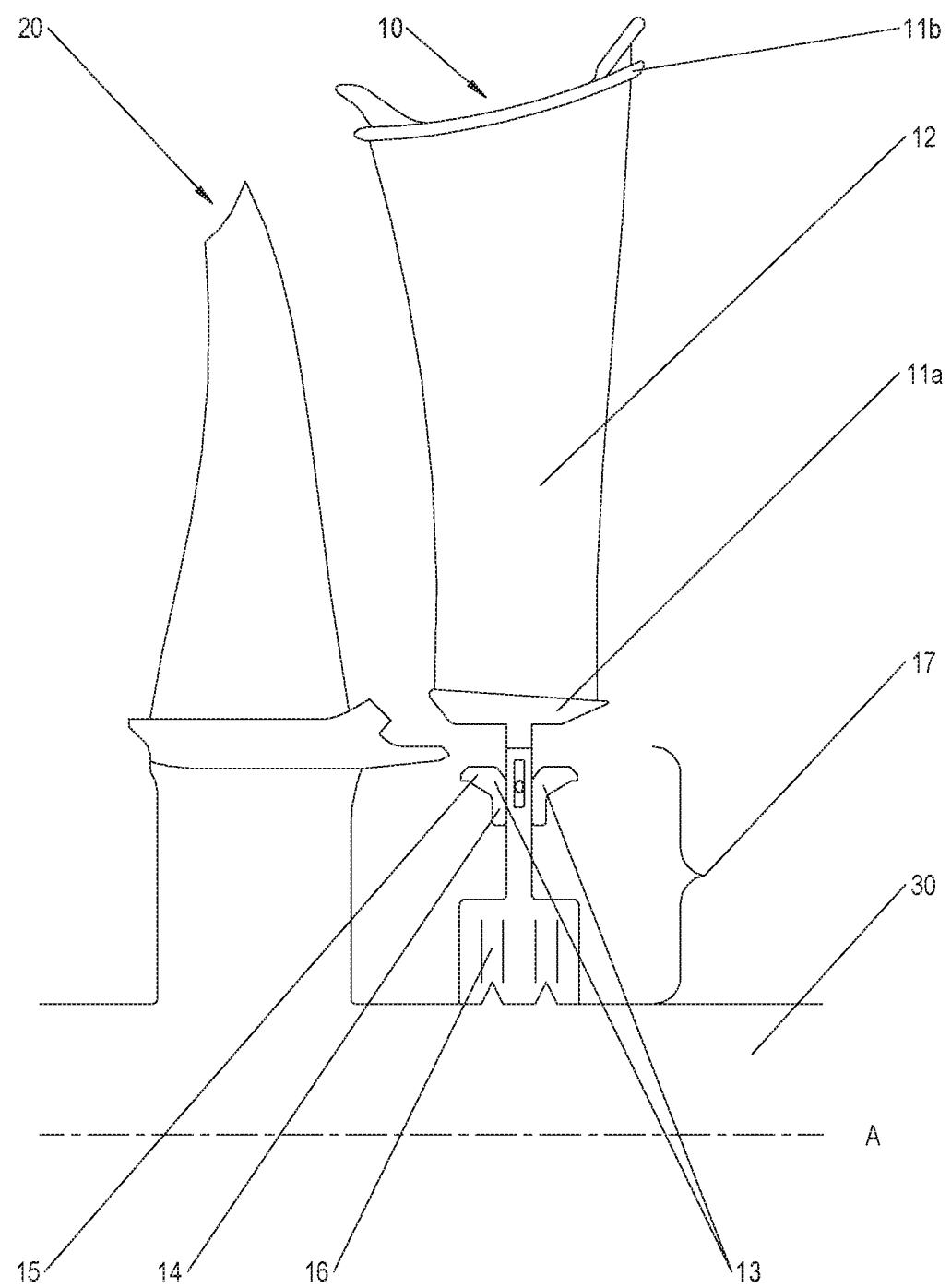
FIG. 1: an exemplary arrangement of a rotating blade and a guide vane with a sealing ring fastened thereto in a sectional illustration.

Shown schematically in FIG. 1 is an arrangement of a guide vane 10 and an exemplary, axially adjacent rotating blade 20 in a sectional illustration, wherein a meridional section is illustrated, that is, a sectional plane that comprises the machine axis or axis of rotation A of the turbomachine.

The rotating blade 20 is joined to a rotor shaft 30 and is constructed so as to rotate together with the rotor shaft 30 around its axis of rotation A. This axis of rotation A is, in addition, a central axis of the arrangement shown, with respect to which the rotating blade 20 and the guide vane 10 are oriented essentially radially. The direction of an intended primary flow runs from left to right in the illustration of FIG. 1.

The guide vane 10 has a radially inner cover plate 11a, a radially outer cover plate 11b, and a vane element 12 lying in between. A sealing ring 17 is preferably attached to the radially inner cover plate 11a and, in particular, is hung in a spoke-centered manner, in such a way that it can undergo thermal expansion in the radial direction (that is, perpendicular to the axis of rotation A) independently from a guide vane cascade, which is formed from a plurality of guide vanes 12 that are adjacent in the peripheral direction.

The seal 17 comprises a brush or run-in coating sealing ring 16 facing the rotor shaft 30 for reduction of any leakage through a peripheral gap between the guide vane cascade and the rotor shaft. Beyond this, the seal has two sealing rings 13, which are arranged in the radial direction between the brush or run-in coating sealing ring 16 and the radially inner cover plate 11a and rotate around the rotor shaft. In the sectional illustration of FIG. 1, a fastening means 14 in the form of a fastening edge and a ring part 15 of a respective sealing ring 13 extending essentially in the axial direction can be seen; in the present example, the ring part 15 runs essentially cylindrically around a central axis (which coincides with the axis of rotation A of the rotor shaft); alternatively, the ring part could run conically (with the same axis), for example, or at least have a conical section and/or at least a cylindrical section.

The ring parts 15 of the two sealing rings 13 form a kind of labyrinth seal together with the radially inner cover plate 11a of the guide vane 10 and an axial projection of a radially inner cover plate of a rotating blade axially adjacent to each of the guide vanes 10, of which only an upstream (left in FIG. 1) rotating blade 20 is illustrated in FIG. 1. It serves to reduce any undesired flow of air in the radial direction in the region between the radially inner end of the guide vanes 10 and the respectively adjacent rotating blades 20. When the rotating blade 20 and the guide vane 10 involve turbine blades and vanes of the turbomachine, the labyrinth seal prevents, in particular, any intake of hot gas from the hot-gas duct radially inward to the rotor shaft 30.

Figure 2:
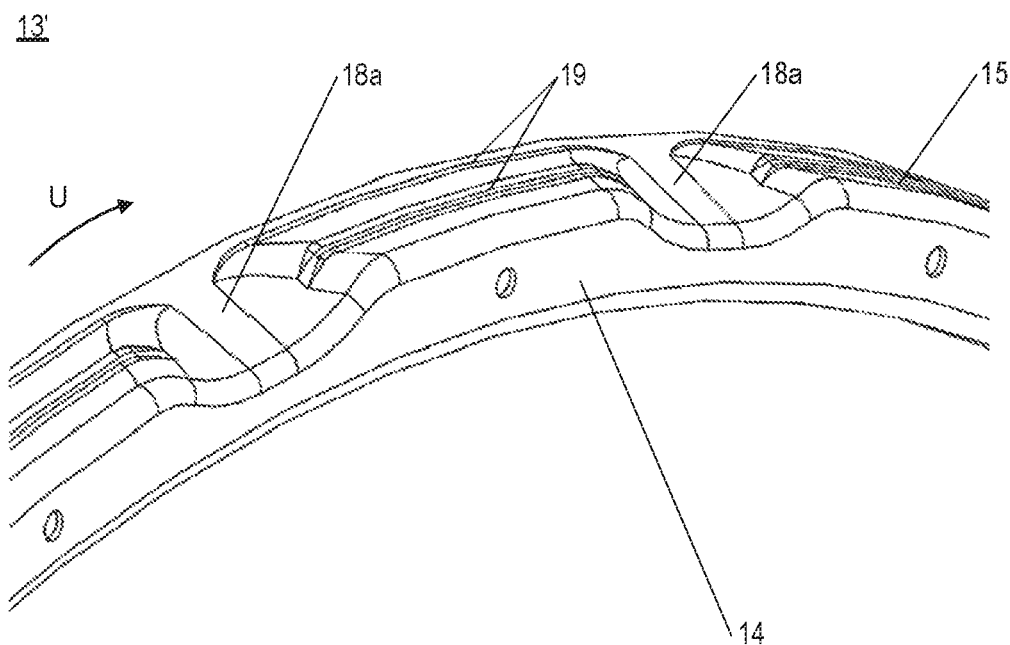
FIG. 2: a section of an exemplary sealing ring according to the invention.
Figure 3:
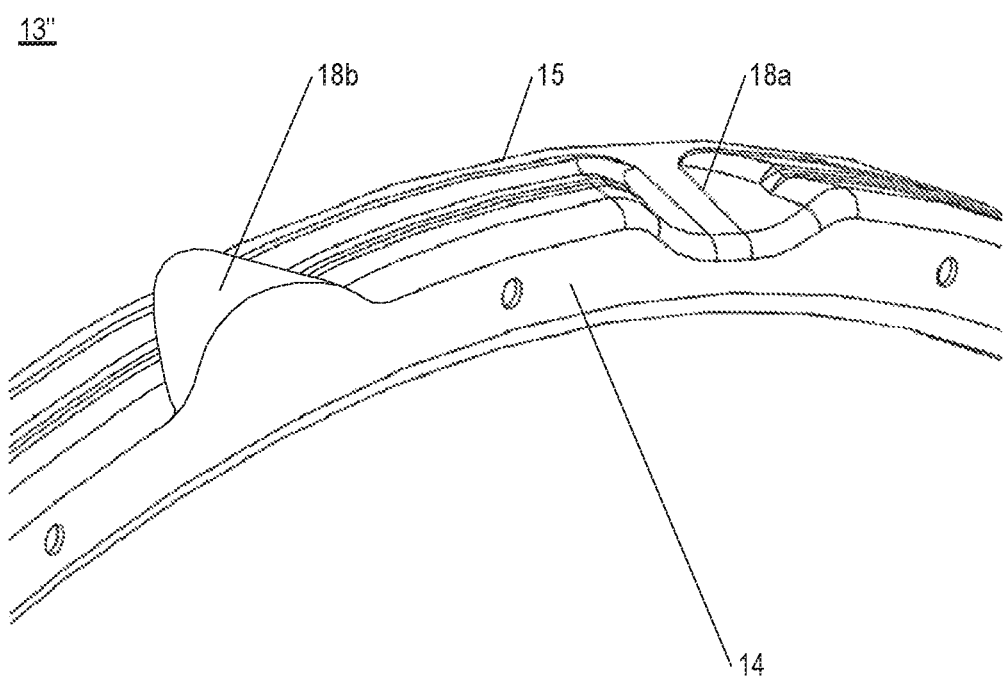
FIG. 3: a section of an alternative exemplary sealing ring according to the invention.

In FIG. 1, the plurality of stiffened portions, which are arranged in the peripheral direction on a sealing ring according to the invention, cannot be seen more closely; they can be seen in FIGS. 2 and 3, which each show a section of a respective sealing ring 13' and 13" according to the invention:

The sealing ring 13' illustrated in FIG. 2 has a fastening means 14 in the form of a fastening edge as well as a ring part 15, which is at an angle thereto and extends essentially in the axial direction. In FIG. 2, the view is onto the surface area of the fastening means 14, which, in the mounted state, rests against a corresponding counter-fastening surface area, in particular a radial projection, of the brush or run-in coating sealing ring. The ring part 15 extends backward from the image plane of FIG. 2. Provided in the fastening edge are a plurality of holes spaced apart from one another in the peripheral direction, wherein the holes serve for fastening of the sealing ring 13' to the brush or run-in coating sealing ring 16 or else serve for indirect or direct fastening to the guide vanes 10 or the guide vane segments that form a guide vane cascade. In particular, in the mounted state of the sealing ring 13', a bolt or the like can extend through a respective hole in the sealing ring 13' in the axial direction, the bolt then passing through at least one other hole that is provided in the brush or run-in coating sealing ring. Furthermore, the bolt can pass through a slide block or the like (not shown), which is accommodated between two radially inward directed projections (also referred to as "tang") at the guide vane 10 or at a guide vane segment in the radially direction in a movable manner with respect to the guide vane 10 or the guide vane segment so as to bring about a spoke centering in this way.

The ring part 15 of the sealing ring shown in FIG. 2 has peripheral grooves 19 as well as a plurality of stiffened portions 18a (two of which can be seen in the illustrated section), which are arranged in succession in the circumferential direction U. In this case, the stiffened portions 18a in the example shown are designed as depressions, which extend radially inward, the edge faces of which are arched. The stiffened portions 18a are tapered in the axial direction starting from the fastening edge 14. The free edge of the ring part 15 is circular in shape and does not have any radial depressions or elevations. This is advantageous in order that a uniform sealing gap exists over the entire periphery between the free edge of the ring part 15 and the axial projection of the axially adjacent rotating blade.

The stiffened portions 18a in the exemplary embodiment shown are formed essentially in the shape of a rotational paraboloid, wherein, in addition, the transitions between the stiffened portions and an essentially cylindrical surface area of the ring part 15 are rounded. However, this need not necessarily be the case. For example, the stiffened portions 18a can also have flat surface area segments.

Illustrated in FIG. 3 is a sealing ring 13" according to the invention, which has, like the sealing ring 13' shown in FIG. 2, a fastening means 14 in the form of a fastening edge as well as a ring part 15 that is at an angle thereto and extends essentially in the axial direction.

In this case, the ring part 15 of the sealing ring 13" has various types of stiffened portions, two of which are shown in FIG. 3: The stiffened portion 18a is formed, as described with reference to FIG. 2, as a radial well or depression, which is arched in several directions (and, in this exemplary embodiment, is shaped essentially as a rotational paraboloid) and becomes narrower (that is, tapers) starting from the fastening edge 14 in the axial direction. In contrast to this, the stiffened portion 18b is formed as a radial elevation, which extends radially outward. It is essentially conical in shape, with an associated conical axis running parallel to a central axis (not shown) of the sealing ring, which corresponds to the axis of rotation A (see FIG. 1). The stiffened portion 18b also tapers in the axial direction starting from the fastening edge 14.

Preferably, the stiffened portions 18a, 18b are arranged at regular intervals in the peripheral direction around the sealing ring 13", it being possible for the various types to alternate, for example.

Disclosed is a sealing ring 13, 13', 13" for a turbomachine, which is constructed so as to be fastened in each case at a radially inner region of a plurality of guide vanes 20 and to rotate around a rotor shaft 30. The sealing ring comprises a ring part 15 that extends in the axial direction and has a plurality of stiffened portions 18a, 18b in succession in the peripheral direction.

Further disclosed is a seal 17 for a turbomachine, which comprises such a sealing ring 13, 13', 13" as well as a brush and/or run-in coating sealing ring 16 that is to face a rotor shaft 30, and a method for the manufacture of a sealing ring.

What is claimed is:

1. A sealing ring for a turbomachine, is configured and arranged to be fastened to each radially inner region of a plurality of guide vanes and rotate around a rotor shaft, the rotor shaft extending in an axial direction, wherein the sealing ring comprises an axially extending ring part that extends substantially in the axial direction and a fastening portion that extends substantially in a radial direction from the ring part, wherein the ring part has a radial facing surface that has a plurality of stiffened portions disposed in succession along a peripheral direction, wherein the turbomachine further comprises a rotating blade cascade with a plurality of rotating blades that is axially adjacent to the plurality of guide vanes, wherein each of the plurality of guide vanes each comprise a radially inner cover plate and the rotating blades each comprise an axial projection at a radially inner region, the axial projection of the rotating blades being directed toward the plurality of guide vanes, wherein the ring part of the sealing ring that extends in the axial direction forms a labyrinth seal together with the radially inner cover plates of the plurality of guide vanes and the axial projections of the rotating blades, wherein at least a portion of the plurality of stiffened portions or all of the plurality of stiffened portions are each essentially conical shaped and/or rotational paraboloid shaped, wherein the plurality of the stiffened portions extend in the axial direction from a fastening means edge towards an opposing edge, wherein the plurality of stiffened portions does not extend to the opposing edge, and wherein the stiffened portions are formed conically proceeding from the fastening edge in the axial direction and/or are formed so as to taper parabolically.

2. The sealing ring according to claim 1, wherein the stiffened portions are distributed uniformly on the ring part extending in the axial direction.

3. The sealing ring according to claim 1, wherein the stiffened portions comprise radial wells and/or radial elevations.

4. The sealing ring according to claim 1, wherein the stiffened portions are tapered in the axial direction starting from a fastening means of the sealing ring.

5. The sealing ring according to claim 1, including a seal for the turbomachine, which is configured and arranged to be fastened to a radially inner region of the plurality of guide vanes and to rotate around the rotor shaft, wherein the seal comprises at least one sealing ring and a brush and/or run-in coating sealing ring that faces the rotor shaft.

6. The sealing ring according to claim 5, wherein turbomachine with the rotor shaft, the plurality of guide vanes, which together form a guide vane cascade of a turbine stage or a compressor stage, and the seal,
wherein the seal, together with the at least one sealing ring, is fastened to the radially inner region of the plurality of guide vanes.

7. The sealing ring according to claim 6, wherein the axial projections of the rotating blades are arranged in the radial direction between the radially inner cover plates of the guide vanes and the ring part of the sealing ring.

8. The sealing ring according to claim 6, wherein the guide vane cascade comprises two sealing rings, wherein one of the two sealing rings forms a labyrinth seal with an upstream rotating blade cascade and the other one of the two sealing rings forms a labyrinth seal with a downstream rotating blade cascade.

9. The sealing ring according to claim 1, wherein at least a part of the stiffened portions or all stiffened portions is or are impressed as radial wells and/or molded as radial elevations in the outer surface.

* * * * *